No. 793,681.                                           Patented July 4, 1905.

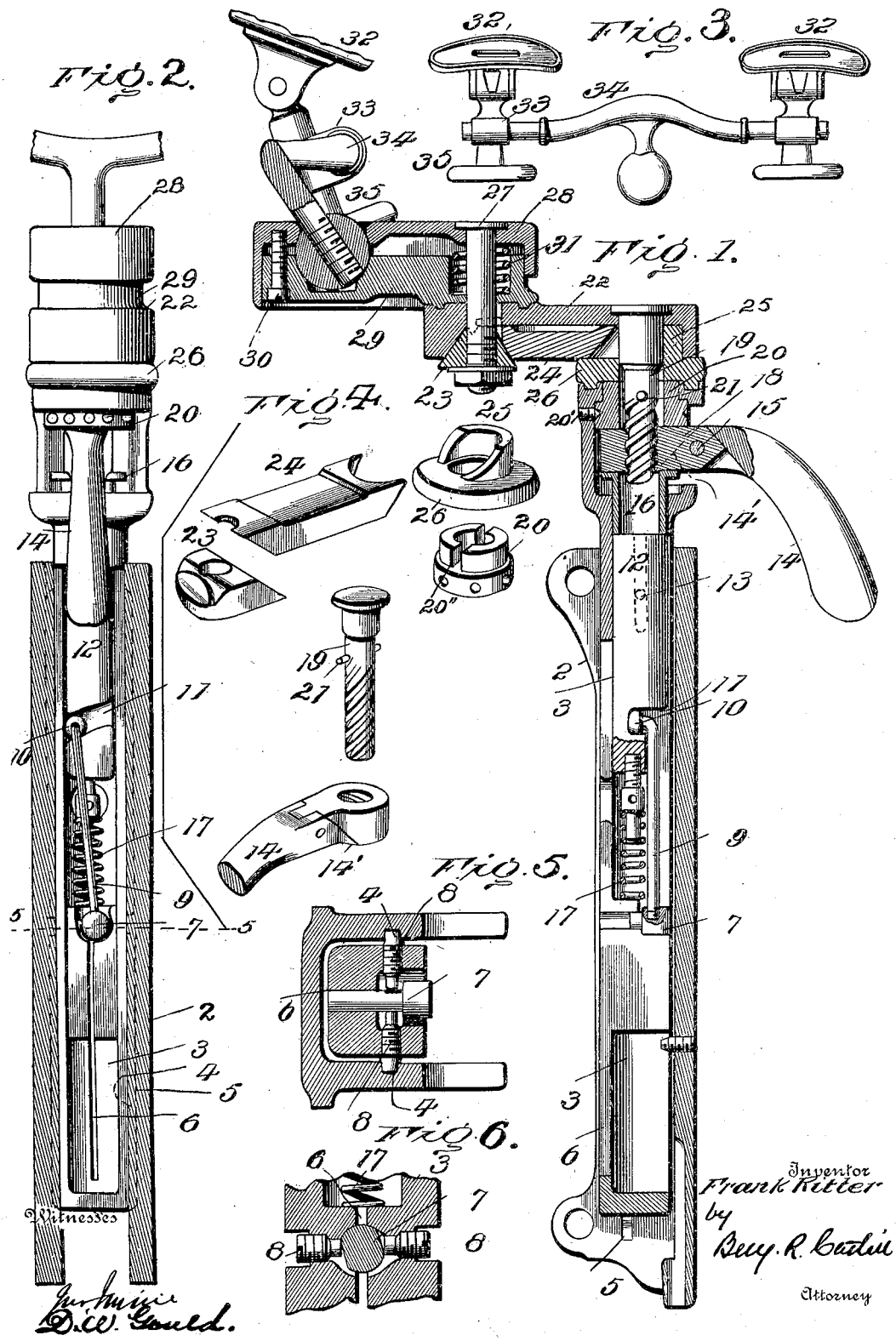

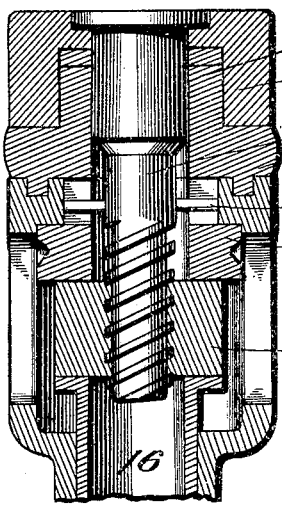
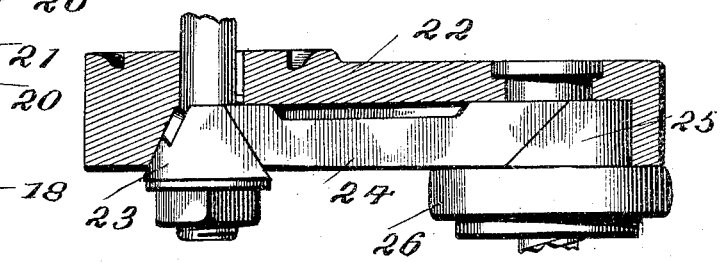
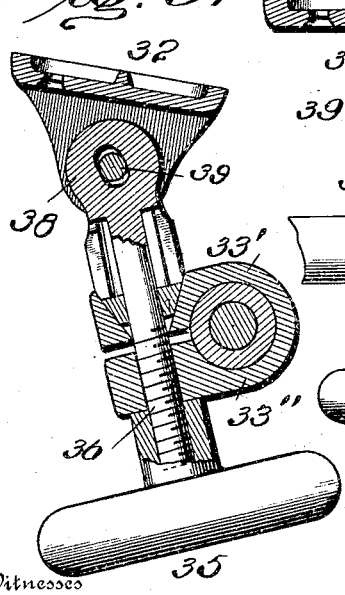
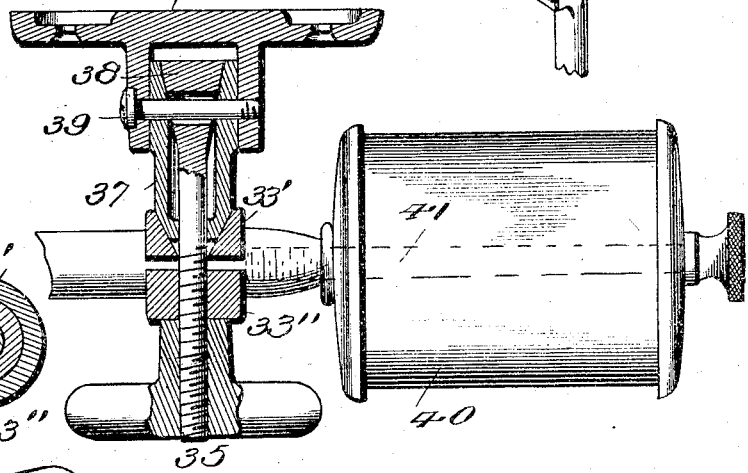

UNITED STATES PATENT OFFICE.

FRANK RITTER, OF ROCHESTER, NEW YORK.

HEAD-REST FOR DENTAL CHAIRS.

SPECIFICATION forming part of Letters Patent No. 793,681, dated July 4, 1905.

Application filed February 5, 1900. Serial No. 3,999.

*To all whom it may concern:*

Be it known that I, FRANK RITTER, a resident of Rochester, in the county of Monroe and State of New York, have invented certain new and useful Improvements in Head-Rests for Dental Chairs; and I do hereby declare the following to be a full, clear, and exact description of the invention, such as will enable others skilled in the art to which it pertains to make and use the same.

The invention relates to head-rests and supports therefor suitable for attachment to chairs and seats, and has for its object to increase the usefulness, ease of manipulation, and general efficiency of such devices.

The invention consists in the construction hereinafter described and pointed out.

In the accompanying drawings, Figure 1 is a longitudinal section of a head-rest support. Fig. 2 is a partial transverse section of the same. Fig. 3 is an elevation of the metallic parts of the head-rest pads and their supporting-bar. Fig. 4 is a perspective of separated members of head-rest-locking mechanism. Fig. 5 is a section on line 5 5 of Fig. 2. Fig. 6 is a vertical section on line 6 6 of Fig. 5. Fig. 7 is a partial vertical section on line 7 7 of Fig. 1. Fig. 8 is a section of a sliding wedge-cover connected to the wedges. Fig. 9 is a partial section of a pad and clamp. Fig. 10 is a transverse section of the same, showing a connected arm-rest. Fig. 11 is a perspective of a wedge-formed part actuated by the handle to lock a head-rest pad.

2 denotes a guide-block to be secured to a chair-back. (Not shown.)

3 is a slide-bar having ribs 4 sliding in ways 5 in the guide-block. The bar is slitted at 6 to permit the ribbed parts to be spread. Said parts are spread for the purpose of binding them in their ways to lock the bar to the guide-block. This is effected by a rotatable cam or pin 7, having two sides cut away, as indicated in Fig. 6. Regulable stops 8, adjustably fixed in the members of the slitted bar 3, are normally held apart by the pin 7, and said bar is thereby spread to lock its ribs in the ways 5. It is unlocked by rotation of the pin to bring its flattened sides in line with said stops. The ribs are cut away adjacent stops 8, ends of the same adjacent the stops being shown in Fig. 5.

The pin 7 is fixed to a rod 9 at its foot. (See Figs. 1 and 2.) The rod has at its upper end an antifriction-roller 10, situated in an inclined way 11, formed in a plug 12, lengthwise movable in the sliding bar 3, but held against rotation by a screw 13. The plug is forced down to unlock the slide-bar, as stated, by the elevation of a handle 14 about its pivot 15, with the effect to force the end 14' of said handle upon a movable thimble 16, bearing on the upper end of the plug 12. The depression of the plug causes the roller end of the rod 9 to travel in the inclined way 11, with the effect to bring the flattened sides of pin 7 immediately opposite the ends of the stops, thereby permitting free movement of the ribs in the ways. This operation is reversed automatically to relock the slide-bar by a returning-spring 17.

18 is a ring having a screw-threaded connection with a bolt 19, to which ring the handle 14 is pivoted, as shown, and so that the ring and handle move together about the threaded bolt 19, the pins 21 being engaged in the slots 20'' of the sleeve. The handle 14 is used to partially rotate the ring to screw down the bolt, which is held against rotation by pins 21, engaged in slots 20'' of the sleeve 20, fixed to the slide after adjustment by a screw 20'. The bolt can be properly adjusted in assembling the parts by means of said sleeve, which has holes to receive a spanner for the purpose. This having been effected, the sleeve is fixed to the slide-bar by a screw.

A wedge-block case or cover (denoted by 22) is rotatable about the bolt 19 and contains two wedge-blocks 23 and 24 and the wedge-shaped head 25 of a collar 26, loose on the bolt and bearing against the upper end of the slide-bar. The bolt 19 projects through the case 22, collar 26, the adjusting-spring 20, and ring 18. The latter bears against the sleeve, which abuts against the top of the slide-bar 3, so that when the handle is revolved to rotate the ring on the bolt 19 the head of the bolt is drawn downwardly upon the case, thereby crowding the block 24 and the collar 26 together to force said block longitudinally. This movement actuates the wedge-block 23, with the effect to draw down the bolt 27 and cause a relative movement of the proximate ends of the case 28 and lever 29, securing them on the case 22. The part 28, which is substantially a lever and styled for convenience of description a "case," is secured to the lever 29 by the screw 30, which forms a fulcrum, and as these parts are drawn together they clamp the ball of the ball-and-socket joint, the screw permitting a slight rocking movement of the connected parts. The bolt 27 extends through the levers 28 and 29 and is held in place by a nut and is surrounded by a spring 31, that acts to free the ball from the clamping action of said lever when the handle 14 is suitably manipulated.

32 denotes a pad-support, the usual covering thereon being omitted.

33 is a bar-clamp adjustable on the pad-supporting bar 34. Said clamp is fixed on the bar by the handle 35, having suitable connection with a screw 36, whereby the parts 33' and 33'' of the clamp (see Figs. 9 and 10) can be forced toward each other between said handle and the frusto-conical end of a two-armed member 37 of a pad-clamp. When the handle is suitably turned on the bolt 36, with which it has a screw-thread connection, the wedge-shaped head 38 of the bolt will be drawn between the arms of the clamp member 37, with the effect to crowd them outwardly, which operation is practically simultaneous with the clamping of the pad on the bar 34. The parts 33'', 33', and 37 have no thread connection with the bolt and are forced together lengthwise the bolt between the handle and wedge 38. When the handle is turned oppositely, the parts are loosened and the pad can be turned on its pivot 39 and together with clamp member 37 rotated transversely to insure any desired adjustment.

40 denotes a hand-and-arm rest, secured in the present instance to the pad-supporting bar by a screw 41, having a milled head for its manipulation either in connecting the rest to the bar or to permit its adjustment or removal.

Having thus described my invention, what I claim is—

1. The combination of a head-rest, a bar-supporting guide-block to attach to a chair-back, a slitted bar to support the rest sliding in said bar, a cam-pin rotatable between the members of said slitted bar, a spring and mechanism intermediate the spring and cam-pin whereby the spring controls the pin to spread the bar and clamp it in its guide.

2. The combination of a head-rest, a bar-supporting guide-block to attach to a chair-back, a slitted bar to support the rest sliding in said bar, a cam-pin rotatable between the members of said slitted bar, a spring and mechanism intermediate the spring and cam-pin, whereby the spring controls the pin to spread the bar and clamp it in its guide, and a lever-handle to overcome the spring and reverse said intermediate mechanism to release the bar.

3. The combination of a head-rest, a bar-supporting guide-block to attach to a chair-back, a slitted bar to support the rest sliding in said bar, a cam-pin rotatable between the members of said slitted bar, a spring and mechanism intermediate the spring and cam-pin, whereby the spring controls the pin to spread the bar and clamp it in its guide, a lever-handle operative at will to overcome the spring and reverse said intermediate mechanism to release the bar, and independent devices intermediate said handle and the head-rest to lock the latter at will, whereby the head-rest may be locked either simultaneously with or separately from the unlocking of the slide-bar.

4. In combination, the head-rest having a supporting-stem provided with a ball, a ball-locking lever, a case inclosing the ball and lever, the case and lever each having a partial socket for the ball, a screw loosely connecting the lever and case and constituting the lever-fulcrum, and mechanism comprising coacting wedge-blocks to draw down the case upon the ball and thereby clamp it in the case.

5. In combination, the head-rest having a supporting-stem provided with a ball, a ball-locking lever, a case inclosing the ball and lever, the case and lever each having a partial socket for the ball, a screw loosely connecting the lever and case and constituting the lever-fulcrum, and mechanism to draw down the case upon the ball and thereby clamp it in the case.

6. The combination of the case 22, the collar 26 having a wedge-shaped part 25, the sleeve 20, the bolt 19 passing through the sleeve, the ring screwing on the bolt to draw it downwardly, and parts coacting with said case and wedge to clamp a head-rest.

7. In combination, the head-rest having a supporting-stem provided with a ball, a ball-locking lever, a case inclosing the ball and lever, the case and lever each having a partial socket for the ball, a screw loosely connecting the lever and case and constituting the lever-fulcrum, mechanism to draw down the case upon the ball and thereby clamp it in the case, and a spring to release the ball.

8. In combination, the ball-and-lever case, a case containing a sliding wedge-block, the lever separating the cases, a bolt loosely connecting the cases and lever, a wedge on said bolt, and mechanism to move the sliding wedge against the bolt-wedge to lock the cases and lever together, said mechanism comprising the wedge-head collar, the bolt 19 and a screw-threaded handle engaging the bolt.

9. In combination, the ball-and-lever case, a case containing a sliding wedge-block, the lever separating the cases, the ball of a head-rest-supporting stem, a bolt loosely connecting the cases and lever, a wedge on said bolt, and mechanism to move the sliding wedge against the bolt-wedge to lock the cases and lever together, and draw down the case upon the ball to lock the same.

10. In combination, the ball-and-lever case, a case containing a sliding wedge-block, the lever separating the cases, the ball of a head-rest-supporting stem, a bolt loosely connecting the cases and lever, a wedge on said bolt, and mechanism to move the sliding wedge against the bolt-wedge to lock the cases and lever together, and draw down the case upon the ball to lock the same, said mechanism comprising the wedge-head collar, the bolt 19 and a screw-threaded handle engaging the bolt.

11. The combination with a guide-bar, a supporting-bar movable thereon, a head-rest and locking mechanism therefor mounted on the supporting-bar, of a locking device for securing the latter to the guide-bar comprising a longitudinally-movable member, a threaded bolt coöperating with the head-rest-locking mechanism projecting through the supporting-bar and a ring on the bolt, a sleeve located between the ring and the bar, connections between the sleeve and bolt for rotating the latter with the former and permitting its longitudinal movement and a handle pivoted on the ring and engaging the movable member to release the locking device.

12. The combination with a guide-bar, a supporting-bar movable thereon, a head-rest and locking mechanism therefor mounted on the supporting-bar, of a locking device for securing the latter to the guide-bar comprising a longitudinally-movable member, provided with a recessed end, a threaded bolt coöperating with the head-rest-locking mechanism and projecting through the supporting-bar and a ring on the bolt engaging the end of the longitudinally-movable member, a sleeve located between the ring and bar, a loose connection between the sleeve and bolt, whereby the latter may be adjusted in the ring, means for holding the sleeve in adjusted position, and a handle for rotating the ring, said handle being pivoted thereon and having an end engaging the member.

13. The combination with a guide-bar, a supporting-bar movable thereon, a head-rest and locking mechanism mounted on the supporting-bar, of a locking device for securing the latter to the guide-bar comprising a longitudinally-movable member, a threaded bolt coöperating with the head-rest-locking mechanism and projecting through the supporting-bar and a ring on the bolt, a sleeve located between the ring and bar having a slot therein, a pin on the bolt resting in said slot and means for holding the sleeve in adjusted position, a removable thimble resting on the longitudinally-movable member, with its upper recessed end engaging the ring and a handle for rotating the latter, said handle being relatively movable thereon and engaging the thimble to operate it away from the ring.

14. The combination of a head-rest pad, a ball-and-socket joint, the pad-supporting bar held by the ball of said joint, a split clamp embracing the bar and provided with a socket to receive the pad-clamp, said split clamp being adjustable both lengthwise and circumferentially of the bar, a pad-clamp having two members and a conical projection fitting said socket, a screw having a wedge-shaped head to crowd upon the members of the pad-clamp, and a handle operatively connected to the screw.

In testimony whereof I have signed this specification in the presence of two subscribing witnesses.

FRANK RITTER.

Witnesses:
 WM. F. LYNN,
 JOHN H. CHADSEY.